United States Patent Office 3,196,048
Patented July 20, 1965

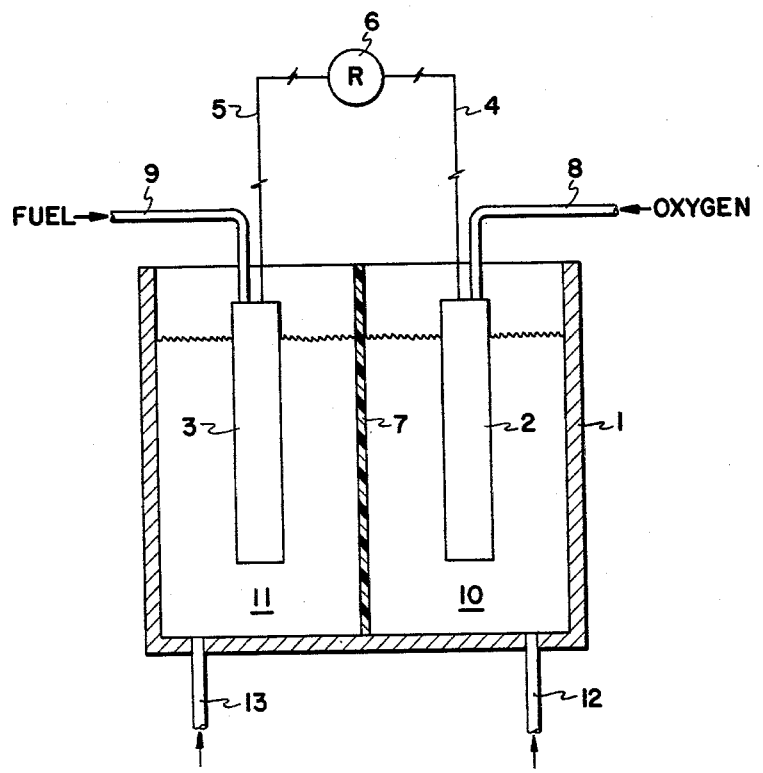

3,196,048
CATHODE CATALYST FOR FUEL CELLS
Joseph A. Shropshire, Scotch Plains, and Barry L. Tarmy, Berkeley Heights, N.J., assignors to Esso Research and Engineering Company, a corporation of Delaware
Filed Dec. 19, 1961, Ser. No. 160,571
3 Claims. (Cl. 136—86)

This invention relates to improvements in the direct production of electrical energy, i.e. by conversion of chemical energy to electrical energy through electrochemical oxidation of a combustible or nonmetallic fuel. In particular, this invention relates to improvements in fuel cells and especially to a cathodic half-cell therein. More particularly, this invention relates to a novel and highly effective combination of catalyst and electrolyte for use in such cells.

Fuel cells employing acid electrolytes and noble metal catalysts are known in the art, e.g., R. Gunn et al., U.S. Patent 2,384,463. In fuel cell systems employing sulfuric acid as the sole electrolyte, gold is catalytically inferior to other noble metals and heretofore has been successfully employed in sulfuric acid, the most common acid electrolyte, only when used in minor proportions in certain specific combinations of metals where the catalytic effect achieved was derived from the peculiarities of the combination.

It now has been surprisingly discovered that gold, when employed in combination with nitric acid in a sulfuric acid electrolyte, greatly improves the capacity and efficiency of the cathodic half-cell and hence the over-all value of the cell.

The term "fuel cell" is used herein in accordance with the common usage of such term in the art to refer to a device, apparatus or system wherein hydrogen gas or a fluid organic compound of lower oxidation state than carbon dioxide is oxidized electrochemically with resulting net production of electrical energy. The fuels suitable for use in these cells are well known in the art and need not be dealt with exhaustively here. In general the preferred fuels have been the hydrogen comprising fuels, i.e. hydrogen and organic compounds containing hydrogen in their molecular structure, e.g. $C_1$–$C_{12}$ hydrocarbons and oxygen substituted hydrocarbons having a significant solubility in the electrolyte employed. Especially preferred fuels include $C_2$–$C_5$ olefins, $C_1$–$C_5$ alcohols, $C_2$–$C_3$ glycols, and hydrogen. Higher molecular weight organic compounds may also be used employing techniques known in the art. These include hydrocarbons and substituted hydrocarbons of carbon, hydrogen and oxygen which may include other substitutents. In the case of higher molecular weight fuels, one may employ elevated temperatures, mutual solvents and other techniques known in the art to increase fluidity, solubility and reactivity. The over-all fuel cell reaction is the sum of two essentially independent half-cell reactions. At the anode, hydrogen or a hydrogen-containing liquid or gas is electrochemically oxidized with a release of electrons to the anode while an oxidant is reduced at the cathode with an acceptance of electrons. The electrical circuit is completed by ion transfer between electrodes through the electrolyte and electron transfer between electrodes by conductors positioned outside such electrolyte. Such cells may be electrically connected in series and/or parallel. An effective fuel cell is therefore dependent upon the effective operation of both cathodic and anodic half-cells.

It is within the scope of this invention to carry out the cell operation employing a conventional gas diffusion cathode of suitable acid resistant material to introduce the oxygen gas to the electrolyte. However, the electrolyte of this invention makes feasible a method of novel operation wherein the continuous supply of oxygen gas, either as pure oxygen or admixed as in air, is introduced directly into the electrolyte before or without contacting the cathode. This eliminates the many problems and limitations inherent in the use of "gas diffusion electrodes." In the past it has been possible to successfully employ a fuel electrode or anode which was no more complicated in construction than a simple sheet of metal surfaced with the desired catalyst. Anodes of this type have been used with anolyte soluble fuels, e.g. methyl alcohol. However, the effectiveness of the cathode has been limited in cells receiving a continuous flow of oxygen gas by the necessity for three phase contact between such gaseous oxidant, the liquid electrolyte and the solid conductor or cathode. The terms "gas diffusion electrode" and "non-diffusion electrode" have acquired a meaning in the art and are employed in accordance with such meaning. Basically the meaning of the terms is concerned with the manner in which they are employed although certain types of electrode structures have become identified with one or the other of such terms. An electrode functions as a diffusion electrode when a reactant gas, i.e. fuel or oxidant as the case may be, passes into, through or along a surface of the electrode before contacting the liquid electrolyte. An electrode functions as a non-diffusion electrode when the half-cell reaction involved is carried out with the reactant passing directly into the electrolyte without first contacting the electrode.

The most common type of electrode structure utilized as a diffusion electrode is the porous electrode of carbon or suitable metal. These may take the form of a unit comprising two or more places of different porosity or a single structure of the so-called "dual porosity" type wherein relatively large pores containing gas and relatively small pores containing liquid electrolyte meet or intersect within a conductive material.

In a nitric acid comprising catholyte there is no necessity for the oxygen gas admitted to the catholyte to contact the cathode since the oxygen gas is primarily employed to regenerate reduction products of the nitric acid employed therein. This applies where the catholyte is a $H_2SO_4$–$HNO_3$ or $H_3PO_4$–$HNO_3$ acid mixture as well as cells wherein the anolyte contains $HNO_3$ as the sole acid of the anolyte. Since the cathodic half-cell reaction is essentially independent of the anodic half-cell this invention applies to both undivided electrolytes and those separated by an ion permeable partition.

In accordance with this invention gold is employed in contact with a nitric acid compromising electrolyte and preferably constitutes the sole metal component of the cathode in contact with such acid. In one embodiment the gold may be employed in association with a porous carbon electrode base by coating or impregnating the carbon structure with gold in accordance with conventional methods for bonding, affixing, or otherwise associating a noble metal with a carbonaceous catalyst base, e.g. by adsorption of gold ions from aqeous solution followed by reduction in situ with hydrogen at elevated temperatures.

In a preferred embodiment the external surface of a metal sheet or grid is coated with gold so that gold constitutes essentially the only cathodic surface in contact with the electrolyte. The electrodes of this embodiment may be solid gold or prepared by conventional electrodeposition processes wherein a layer of gold is laid down upon a structure formed by one or more other metals, e.g., nickel-steel, copper, silver, nickel, etc. Other methods which surface the base with gold may be used including coating by vacuum metalization techniques, etc. Such electrodes may take any form desired, e.g., a grid, mesh, plate, etc.

Gold is an effective cathode catalyst with catholytes containing above about 0.1 wt. percent $HNO_3$. Catholytes having $HNO_3$ concentrations up to 10 normal, about 48.5 wt. percent, are disclosed in the art and tests made in accordance with this invention with up to 30 wt. percent $HNO_3$ have proven eminently successful. Nitric acid has a disadvantageous effect upon the anodic half-cell and the concentration therein should be minimized or eliminated. A particularly desirable combination is a gold cathode and an aqueous electrolyte containing about 0.5 to 6 wt. percent $HNO_3$ and 25 to 35 wt. percent $H_2SO_4$. When $H_3PO_4$ is employed in lieu of $H_2SO_4$, it is preferred to employ higher concentrations of this acid, by weight.

As aforementioned the gold-nitric acid combination can be advantageously employed in cells having either divided or undivided electrolytes. In the former case the electrolyte is divided into an anolyte and catholyte by an ion permeable partition positioned between the anode and cathode. It is within cells of this type that the higher concentrations of nitric acid, or the equivalent in $-NO_3$ ions, can be efficiently employed. If a common or undivided electrolyte is employed the nitric acid concentration will ordinarily be in the range of about 0.2 to 1.0, preferably about 0.4 to 0.9 wt. percent.

Partitions suitable for this use are well known in the art and do not, as such, constitute a part of this invention. Partitions heretofore used include membranes, glass frits, ceramics, etc. Membranes that have been used for this purpose include ion-exchange resin membranes and interpolymer membranes.

Ion-exchange resin membranes, i.e. organic membrances, at least one component of which is a polyelectrolyte, are well-known in the art. Such membrances include in their polymeric structure dissociable ionizable radicals at least one ionic component of which is fixed to or retained by a polymeric matrix with at least one ion component being a mobile and replaceable ion electrostatically associated with the first component. The ability of the mobile ion to be replaced under appropriate conditions by other ions imparts ion-exchange characteristics to these materials.

An interpolymer membrane is one which is cast from a solution containing both a polymeric electrolyte or inorganic material and a matrix polymer so as to form a film composed of these two intermeshed molecular species. A typical interpolymer membrane is made by dissolving linear polystyrene sulfonic acid and acrylonitrile in N,N-dimethylformamide, casting the solution as a film and evaporating off the solvent.

Cells employing the electrolyte-catalyst combinations of this invention preferably are operated at temperatures above about 130° F. and below the boiling point of the electrolyte at the pressure employed, e.g. 130° to 200° F. when operating at atmospheric pressure.

Referring now to the accompanying drawing which schematically illustrates a simple fuel cell which may be used for carrying out this invention. Shown in the drawing are a vessel 1, a cathode 2 and an anode 3. Cathode 2 and anode 3 are electrically connected by wires 4 and 5 and resistance means 6 which may be any device for utilizing electric current or merely an extension of wires 4 and 5. Vessel 1 of glass, ceramic, polypropylene, hard rubber, metal or other suitable material forms an electrolyte compartment and is here shown uncovered although in practical employment such cells would ordinarily be covered. Cathode 2 and anode 3 may be a hollow, porous, cylinder, metal sheets or grids, a metal surfaced non-conductor, or, in other embodiments may take the form of a porous carbon plate where the electrode is built into the wall forming the electrolyte compartment. The carbon electrodes may be impregnated with a suitable metal catalyst. The anode catalyst is preferably a noble metal of Group VII of the Periodic Table that is chemically resistant to the electrolyte, mixtures of the same, or mixtures of these metals with each other or with gold. Cathode 3 is either a gold surfaced metal electrode, a carbon electrode impregnated with gold, or a non-conductor having a continuous gold surface or solid gold. If metal plates or grids are employed, it is preferred to completely surface the electrode with one or more of these same metals. The electrolyte compartment formed by vessel 1 is here divided by an ion-permeable membrane 7, e.g. an an ion-exchange resin membrane, into a catholyte compartment 10 and an anolyte compartment 11. Membrane 7 is optional equipment.

When cathode 2 and anode 3 are porous carbon cylinders, a fluid oxidant, e.g. oxygen gas, is admitted to the interior of cathode 2 via conduit 8 and a fluid fuel, e.g. hydrogen, is admitted to the interior of anode 3 via conduit 9. When cathode 2 and anode 3 are metal sheets or metal grids a fluid oxidant, e.g. air, is admitted to the catholyte compartment 10 via conduit 12 and a soluble or absorbable fluid fuel, e.g. methyl alcohol or butene-1, is admitted to anolyte compartment 11 via conduit 13.

This invention will be more fully understood from the following examples:

EXAMPLE 1

A fuel cell was operated with an aqueous electrolyte containing 5 wt. percent $HNO_3$ and 29 wt. percent $H_2SO_4$ to determine the effectiveness of gold in comparison to platinum as the catalyst of the cathodic half-cell in contact with nitric acid. Oxygen gas was continuously supplied to the catholyte through the electrolyte and the electrolyte temperaures were maintained at 180° F. The electrodes tested were a gold wire and a platinum wire mesh. The performance of the cathodic half-cell with first gold and second platinum employed as the metal catalyst are compared in the following table:

*Table I*

COMPARATIVE PERFORMANCE OF GOLD AND PLATINUM CATHODES IN CONTACT WITH A 29 WT. PERCENT SULFURIC ACID CONTAINING 5 WT. PERCENT $HNO_3$

| Catalyst | Polarization, in volts, from theoretical oxygen electrode [a] performance (cathode) (a) indicated amps/ft.[2 b] | | | | |
|---|---|---|---|---|---|
| | 0 | 5 | 50 | 100 | 300 |
| Au | 0.01 | 0.10 | 0.18 | 0.20 | 0.38 |
| Pt | 0.07 | 0.30 | 0.60 | (c) | (c) |

[a] The term "Polarization" wherever employed in this specification refers to the difference between observed voltage and the voltage of a reversible electrode operating with the same reactant, temperature, pressure, and electrolyte. It does not refer to the difference between observed voltage and open circuit voltage (rest potential). Theoretical potential (at 180° F., 1 atmosphere, and 30 wt. percent $H_2SO_4$) for the oxygen electrode is 1.21 volts and for the hydrogen electrode 0.01 volt below (negative to) Standard Hydrogen Reference.
[b] Superficial area of cathode in contact with electrolyte.
[c] This level of activity not reached with this catalyst.

The effect of the combination of gold and nitric acid was tested using first a 29 wt. percent $H_2SO_4$ aqueous electrolyte and second the same electrolyte to which first 1 and then 5 wt. percent $HNO_3$ had been added. The cathode employed was a gold wire. The results of these tests are set forth in the following table:

*Table II*

EFFECT OF $HNO_3$ ON GOLD CATHODE PERFORMANCE IN $H_2SO_4$ COMPRISING ELECTROLYTE

| Cathode | Electrolyte | Polarization, in volts, from theoretical oxygen electrode at indicated amps/ft.$^2$ | | | | |
|---|---|---|---|---|---|---|
| | | 0 | 2 | 10 | 30 | 50 |
| Gold wire | 29 wt. percent $H_2SO_4$ and 1 wt. percent $HNO_3$. | 0.08 | 0.14 | 0.17 | 0.20 | 0.25 |
| Do | 29 wt. percent $H_2SO_4$ and 5 wt. percent $HNO_3$. | 0.01 | 0.10 | 0.14 | 0.16 | 0.18 |
| Do | 29 wt. percent $H_2SO_4$ without nitric acid. | 0.16 | 0.80 | (a) | (a) | (a) |

[a] These levels of activity not attained.

Platinum, the most effective single metal cathode catalyst in a conventional sulfuric acid electrolyte, was compared with gold in aqueous sulfuric acid electrolytes without $HNO_3$ addition and again with 1 wt. percent $HNO_3$ addition by testing in accordance with the previous examples but using a small amount of metal on a porous carbon base. The metal content of the electrodes is in each case between 0.5 and 1 wt. percent.

*Table III*

GOLD AND PLATINUM AS CATHODE COMPONENTS IN $H_2SO_4$ AND $H_2SO_4$–$HNO_3$ ELECTROLYTES

| Cathode | Electrolyte | Polarization, in volts, from theoretical oxygen electrode at indicated amps/ft.[2] | | | |
|---|---|---|---|---|---|
| | | 0 | 10 | 30 | 50 |
| Au-on-carbon | 30% $H_2SO_4$ (without $HNO_3$ addition). | 0.33 | 0.54 | 0.76 | 0.90 |
| Pt-on-carbon [a] | ___do___ | | 0.15 | 0.23 | 0.35 | 0.44 |
| Au-on-carbon [b] | 29 wt. percent $H_2SO_4$ and 1 wt. percent $HNO_3$. | 0.12 | 0.14 | 0.19 | 0.22 |
| Pt-on-carbon | ___do___ | | 0.15 | 0.23 | 0.31 |
| Carbon alone | ___do___ | | 0.16 | 0.24 | 0.31 |

[a] Here the superiority of platinum over gold is pronounced.
[b] Here the addition of 1 wt. percent $HNO_3$ reverses the superiority.

It is thus shown that whereas gold is quite inferior to platinum as a fuel cell cathodic catalyst in the absence of nitric acid the effectiveness of the two is surprisingly reversed when nitric acid is present in the electrolyte, even in small quantities. Platinum is chosen as a comparative example in view of its well established superiority as a cathodic catalyst over other individual metals in an acid medium.

EXAMPLE II

The procedure of Example I is repeated substituting phosphoric acid for sulfuric acid as the primary electrolyte and employing concentrations in the range of about 40 to 60 wt. percent. The improvement achieved by using a gold surfaced cathode in this nitric acid mixture corresponds closely to the improvement achievable in $H_2SO_4$–$HNO_3$ mixtures.

The terms "mixture" and "acid mixture" are used herein to refer to any intermingling of two or more acids including mixed solutions.

What is claimed is:

1. In a fuel cell comprising an anode, a cathode, an electrolyte compartment, an ion-permeable partition between said anode and said cathode dividing said electrolyte compartment into an anolyte compartment and a catholyte compartment, an aqueous acid electrolyte selected from the group consisting of sulfuric acid and phosphoric acid in each of said anolyte and catholyte compartments, conduction means external to said electrolyte compartment establishing electrical connection between said anode and said cathode, means for admitting a fluid fuel into the anolyte compartment, the improvement which comprises the combination of about 0.5 to 6 wt. percent nitric acid in said catholyte compartment with a gold catalyzed cathode.

2. A cell in accordance with claim 1 wherein said cathode comprises a porous carbon structure impregnated with said gold.

3. A cell in accordance with claim 1 wherein said nitric acid is admixed with sulfuric acid.

References Cited by the Examiner

UNITED STATES PATENTS

| 2,901,522 | 8/59 | Bopp | 136—86 |
| 2,925,454 | 2/60 | Justi et al. | 136—86 |

FOREIGN PATENTS

| 2,411 | 2/88 | Great Britain. |
| 12,171 | 7/99 | Great Britain. |
| 521,773 | 5/40 | Great Britain. |
| 844,584 | 8/60 | Great Britain. |

JOHN H. MACK, *Primary Examiner.*

JOHN R. SPECK, *Examiner.*